(No Model.) 2 Sheets—Sheet 1.

J. R. REYNOLDS.
GOVERNING DEVICE FOR THROTTLE VALVE CLOSERS.

No. 599,013. Patented Feb. 15, 1898.

Witnesses:
E. W. Fothergill.
E. J. Hyde.

Inventor,
John R. Reynolds,
by Harry R. Williams,
atty.

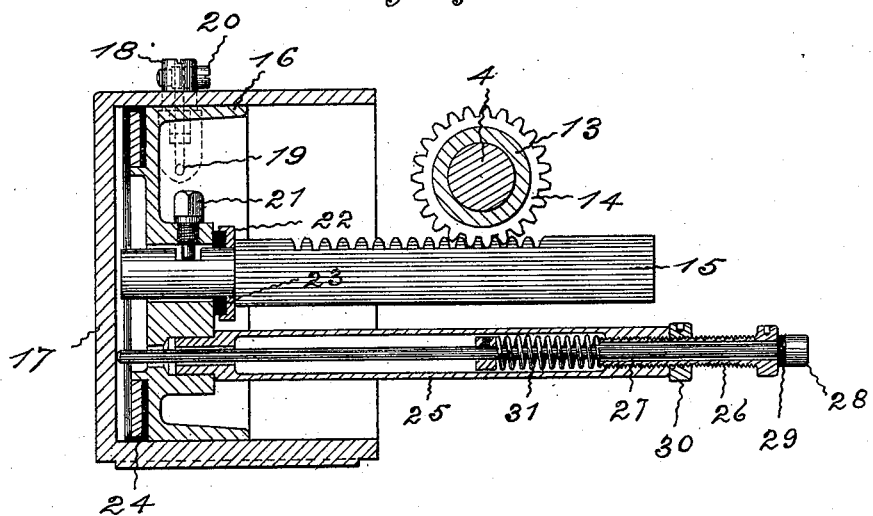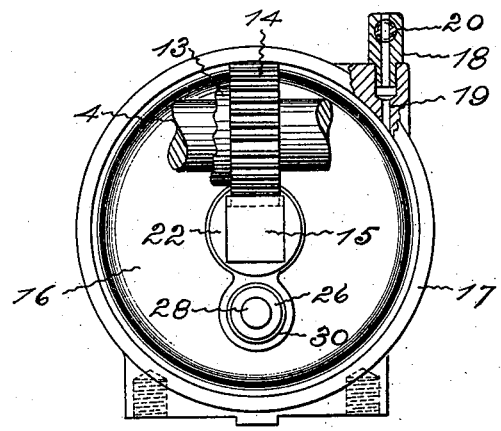

UNITED STATES PATENT OFFICE.

JOHN R. REYNOLDS, OF HARTFORD, CONNECTICUT, ASSIGNOR TO FRANK P. REYNOLDS, OF SAME PLACE.

GOVERNING DEVICE FOR THROTTLE-VALVE CLOSERS.

SPECIFICATION forming part of Letters Patent No. 599,013, dated February 15, 1898.

Application filed September 27, 1897. Serial No. 653,085. (No model.)

*To all whom it may concern:*

Be it known that I, JOHN R. REYNOLDS, a citizen of the United States, residing at Hartford, in the county of Hartford and State of Connecticut, have invented certain new and useful Improvements in Governing Devices for Throttle-Valve Closers, of which the following is a specification.

This invention relates to a device which is employed for controlling the movement of the mechanisms of a machine built to be connected with a throttle-valve and arranged to be set in operation for closing the throttle-valve with which it is connected by any one in the immediate vicinity or at distant localities.

The object of this invention is to provide a simple, durable, and reliable governing device for such a throttle-valve closer which will so act when the mechanisms are set in operation as to insure a rapid, easy, and noiseless closing of the throttle-valve.

The embodiment of the invention, which is illustrated in the accompanying drawings, has a spindle bearing a sprocket-wheel that is adapted to be connected with a corresponding sprocket-wheel on the spindle of a throttle-valve, said spindle bearing a barrel that may be provided with a spring and a drum upon which may be wound a weight-cord for rotating the spindle and closing the throttle-valve, the rotation of the spindle bringing into action a train of differential gears that are connected with a pinion engaging a rack attached to a rod that is joined in a peculiar way with a piston located in a cylinder and having a particular arrangement of valves that, when the parts are set in motion by the release of the tripping mechanisms which retain the motive power under tension, automatically permits the escape of air out of the cylinder from behind the piston in a manner that allows the desired closing of the throttle-valve, as more particularly hereinafter described, and pointed out in the claims.

Figure 1:
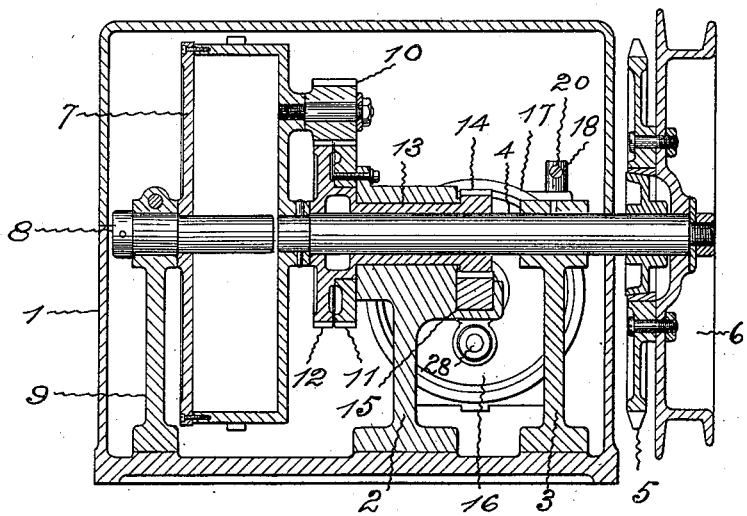
Figure 2:
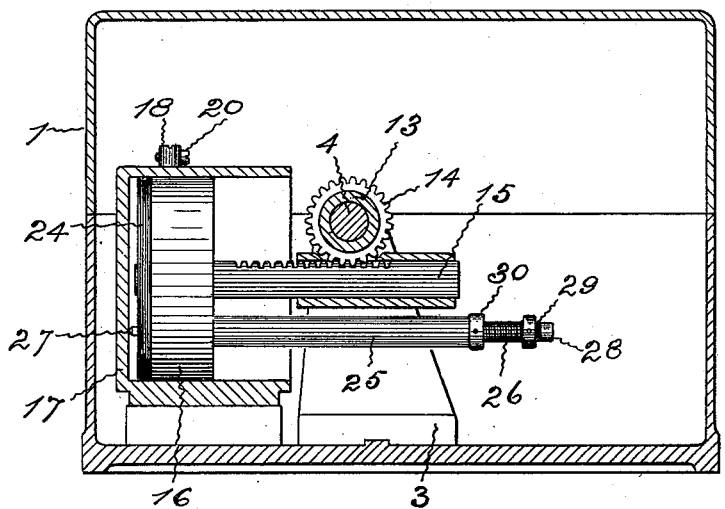

Figure 1 shows a sectional view of an engine-stop provided with an improved governing device. Fig. 2 shows a sectional view taken on a plane passing through the cylinder. Fig. 3 shows an enlarged sectional view taken through the cylinder and piston, and Fig. 4 shows an end view of the cylinder with the piston in place.

The case 1 for inclosing the mechanisms may be built of any suitable material in any approved shape. Attached to the bottom of the case inside are standards 2 and 3, which support the spindle 4. Outside of the case the spindle bears a sprocket-wheel 5, that is adapted to be connected by a common sprocket-chain with a corresponding sprocket-wheel on the spindle of any throttle-valve which it is desired to have closed by the operation of this machine. The sprocket-wheel 5 is preferably adjustably connected with the spindle 4 by common means, and adjacent to it is a drum 6, upon which a weight cord or band may be wound to rotate or aid in the rotation of the spindle when necessary. At the other end the spindle is connected with a barrel 7, that is adapted to receive any common form of driving-spring. One end of the spring, if employed, may be attached to the walls of the barrel, while the other end may be attached to the stud 8, that is held by the standard 9. The spring in the barrel may be utilized to rotate or aid in the rotation of the spindle. The spindle may be supplied with either or both the drum and weight-cord or the spring-barrel for its motive power. When the throttle-valve is opened through the sprocket wheels and chain, the spindle is rotated and the power of the spring or of the weight, or both, as the case may be, is stored up for rotating the spindle in the reverse direction and closing the valve at the desired moment.

Any common form of catch mechanism may be provided for engaging the barrel and retaining the spring under tension or the weight-cord wound up, and any convenient means for tripping the catch mechanism may be used. Such a catch mechanism and tripping means are fully set forth in the application for United States patent filed May 29, 1897, and serially numbered 638,712, and as these mechanisms are not part of the present invention they are not herein illustrated and described.

Mounted upon a stud projecting from the spring-barrel, so as to revolve about the spindle, is a gear 10. This gear meshes with a pair of differential gears 11 and 12, the former of which is fixed to a portion of the standard 2, while the latter is attached to a sleeve 13, that is loosely held by the standard 2. As one of the differential gears has more teeth than the other, the movable gear and the attached sleeve are revolved very slowly by the rotating of the gear 10, that meshes with them as it is carried around with the barrel. This very much reduces the relative rate of rotation between the spindle and the sleeve.

Borne by the sleeve 13 is a pinion 14. This pinion meshes with a rack formed on a rod 15, that is loosely held by bearings supported by the standard 2. Loosely connected with one end of the rod 15 is a piston 16, that is adapted to be moved back and forth in the cylinder 17, that is conveniently located within the case.

In the wall of the cylinder, near the closed end, a plug 18 is screwed. This plug has a longitudinal perforation, and in continuation of this perforation through the plug is an opening 19 through the wall of the cylinder. A transverse threaded perforation is made through the outer end of the plug 18, and in this is screwed a stud 20, that is provided with a transverse perforation which when the stud 20 is turned properly is in line with the perforation through the plug 18, so that air can escape from the cylinder through the opening 19, the plug 18, and the stud 20. The stud 20 can be rotated so as to accurately gage the size of this opening and allow just the correct quantity of air to escape for permitting the proper movement of the piston in the cylinder.

The inner end of the rod 15 is extended completely through the piston, and the opening through which it extends is somewhat larger in diameter than the diameter of the rod. A set-screw 21 is turned in a threaded perforation in the hub of the piston, so that its inner end enters a slot in the rod. The slot is made slightly larger than the end of the screw, and, while the piston will move with the rod, there will be some play between these parts. A collar 22 is placed on the rod 15 a short distance from the end of the hub of the piston, and between this and the hub is a packing-washer 23. When the rod is moved to draw the piston from the closed end of the cylinder, the collar and packing-washer are drawn away from the end of the hub, so that air can pass through the opening between the rod and the walls of the piston into the cylinder back of the piston and permit a free movement. When the rod is moved to push the piston toward the closed end of the cylinder, the washer is forced against the end of the hub, so as to close the opening through the cylinder and prevent the escape of air from the cylinder around the rod.

The piston is provided with a cup-packing 24, and the end of the rod reaches beyond the edge of this packing, so as to prevent the packing from coming into contact with the end of the cylinder and being jammed.

Attached to the walls of the piston is a tube 25, and secured in the outer end of the tube is a threaded sleeve 26. Extending through the tube and the sleeve and also through the piston is a rod 27, which is smaller in diameter than the opening in the tube, sleeve, and piston through which it passes. This rod at its outer end bears a collar 28, between which and the end of the sleeve is a packing-washer 29. On the threaded sleeve is a check-nut 30, and in the tube is a spring 31, arranged to normally draw the rod into the tube, so that the packing-washer 29 will close against the end of the opening that extends through the piston, the tube, and the sleeve. The inner end of the rod 27 reaches beyond the piston and is arranged so at the proper time when the piston is moving inwardly it will make contact with the end of the cylinder. This stops the rod so, as the piston continues to move, that the end of the sleeve will be carried away from the packing-washer, allowing air to escape from the cylinder through the opening in the piston, tube, and sleeve around the rod.

The spring or the weight, or both, may be arranged to cause the spindle to rotate rapidly many turns for closing the throttle-valve when the catch that restrains the power is tripped. There must be a rapid closing of the throttle-valve and there must be an excess of force in the motive means to insure the tight closing of the valve. The governing mechanism must be arranged to allow a rapid movement of the throttle-valve, but insure a gentle and sure closing. The differential-gear mechanism allows a rapid and extended movement of the operating parts and permits of such with a retarding mechanism that moves slowly and but a limited distance, whereby powerful control is kept over the rapid-moving operating parts. The cylinder provided for this mechanism is short and the piston movement limited. The escape-outlet through the cylinder may be regulated so that air back of the piston will escape to just the necessary degree to allow a quick movement of the piston, and this opening is located so that the moving piston will close it and be checked by a solid cushion of air just before the throttle-valve is closed and the motive power is exhausted. At this time the end of the rod borne by the tube carried by the piston is caused to strike the end of the cylinder and open the passage through the tube, so that after the rapid movement of the parts is checked the remaining power will slowly and carefully close the throttle-valve.

When the piston is being moved inwardly, the opening around the piston-rod is stopped; but when the piston is drawn outwardly this opening is free, so that air can readily pass through it to the back of the piston in the cylinder. This is the only means for the entrance of air into the cylinder back of the piston until the piston is drawn outwardly beyond the escape-outlet in the side of the cylinder. When the piston is drawn outwardly and the end of the rod 27 is disengaged from the wall of the cylinder, the spring thrusts the rod so that the opening through the tube is closed.

The mechanisms of this throttle-valve closer can be adjusted to insure a very rapid closing of the throttle-valve, and the governing devices are so arranged and so act that although the movement of the throttle-valve is rapid it will close surely and tightly in a gentle and noiseless manner.

I claim as my invention—

1. In combination with the motive mechanisms of a throttle-valve closer, a rod moved by the movement of the mechanisms, a piston connected with and moved by the rod, a cylinder within which the piston is located, an escape-outlet that is closed by the movement of the piston, and an escape-valve that is opened by the engagement of moving with stationary parts after the closing of the escape-outlet, substantially as specified.

2. In combination with the motive mechanisms of a throttle-valve closer, a rod moved by the movement of the mechanisms, a piston connected with and moved by the rod, a cylinder within which the piston is located, an escape-outlet that is closed by the movement of the piston, an adjustable valve for the escape-outlet, and an escape-valve that is opened by the engagement of moving with stationary parts after the closing of the escape-outlet, substantially as specified.

3. In combination with the motive mechanisms of a throttle-valve closer, a rod moved by the movement of the mechanisms, a piston loosely connected with and moved by the rod, a valve between the loose connections of the rod and the piston, a cylinder within which the piston is located, an escape-outlet that is closed by the movement of the piston, and an escape-valve that is opened by the engagement of moving with stationary parts after the closing of the escape-outlet, substantially as specified.

4. In combination with the motive mechanisms of a throttle-valve closer, a rod moved by the movement of the mechanisms, a piston connected with and moved by the rod, a cylinder within which the piston is located, an escape-outlet that is closed by the movement of the piston, and an escape-valve borne by the piston and adapted to be opened by engagement of a part with the end of the cylinder after the escape-outlet is closed, substantially as specified.

5. In combination with the motive mechanisms of a throttle-valve closer, a rod moved by the movement of the mechanisms, a piston connected with and moved by the rod, a cylinder within which the piston is located, an escape-outlet through the walls of the cylinder that is closed by the movement of the piston, an adjustable plug for regulating the size of the escape-outlet, and an escape-valve borne by the piston and adapted to be opened by engagement of a part with the end of the cylinder after the escape-outlet is closed, substantially as specified.

6. In combination with the motive mechanisms of a throttle-valve closer, a rod moved by the movement of the mechanisms, a piston loosely connected with and moved by the rod, a valve between the loose connection of the rod and the piston, a cylinder within which the piston is located, an escape-outlet through the walls of the cylinder that is closed by the movement of the piston, and an escape-valve borne by the piston and adapted to be opened by engagement with the end of the cylinder after the escape-outlet is closed, substantially as specified.

7. In combination with the motive mechanisms of a throttle-valve closer, a rod moved by the movement of the mechanisms, a piston connected with and moved by the rod, a cylinder within which the piston is located, an escape-outlet through the walls of the cylinder that is closed by the movement of the piston, a tube borne by the piston, a rod extending through the tube and adapted to make contact with the end of the cylinder after the escape-outlet is closed, and a valve connected with a rod and adapted to be opened by the engagement of the rod with the end of the cylinder, substantially as specified.

8. In combination with the motive mechanisms of a throttle-valve closer, a rod moved by the movement of the mechanisms, a piston connected with and moved by the rod, a cylinder within which the piston is located, an escape-outlet through the walls of the cylinder that is closed by the movement of the piston, a tube borne by the piston, an adjustable sleeve carried by the tube, a rod extending through the tube and adapted to make contact with the end of the cylinder after the escape-outlet is closed, a valve connected with the rod and adapted to be opened by the engagement of the rod with the end of the cylinder, and a spring for closing the valve, substantially as specified.

9. In combination with the motive mechanisms of a throttle-valve closer, a rod moved by the movement of the mechanisms, a piston loosely connected with and moved by the rod, a valve between the loose connection of the rod and the piston, a cylinder within which the piston is located, an escape-outlet through the walls of the cylinder that is closed by the movement of the piston, a tube borne by the piston, an adjustable sleeve carried by the tube, a rod extending through the tube and adapted to make contact with the end of the cylinder after the escape-outlet is closed, a valve connected with the rod and adapted to be opened by the engagement of the rod with the end of the sleeve, and a spring for closing the valve, substantially as specified.

10. In combination with the motive mechanisms of a throttle-valve closer, a rod moved by the movement of the mechanisms, a piston loosely connected with and moved by the rod, a valve between the loose connection of the piston and the rod, a cylinder within which the piston is located, an escape-outlet through the walls of the cylinder that is closed by the movement of the piston, a perforated plug communicating with the outlet, a perforated stud borne by the plug for regulating the size of the outlet, a tube borne by the piston, an adjustable sleeve carried by the tube, a rod extending through the tube and adapted to make contact with the end of the cylinder after the escape-outlet is closed, a valve connected with the rod and adapted to be opened by the engagement of the rod with the end of the cylinder, and a spring for closing the valve, substantially as specified.

JOHN R. REYNOLDS.

Witnesses:
H. R. WILLIAMS,
E. W. FOTHERGILL.